(12) United States Patent
Chow et al.

(10) Patent No.: US 6,899,308 B2
(45) Date of Patent: May 31, 2005

(54) PASSIVE GRAVITY-COMPENSATING MECHANISMS

(75) Inventors: Siew Loong Chow, Singapore (SG); Cheng Fu Shi, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 59 days.

(21) Appl. No.: 10/631,135

(22) Filed: Jul. 31, 2003

(65) Prior Publication Data

US 2005/0023424 A1 Feb. 3, 2005

(51) Int. Cl.$^7$ .................................................. E04G 3/00
(52) U.S. Cl. .................. 248/282.1; 74/469; 248/292.12
(58) Field of Search ............................ 248/274.1, 276.1, 248/282.1, 289.11, 292.13, 280, 281.11, 292.11, 332; 74/469

(56) References Cited

U.S. PATENT DOCUMENTS

| | | | | |
|---|---|---|---|---|
| 4,230,210 A | * | 10/1980 | Hintsch ........................ | 192/28 |
| 4,266,747 A | * | 5/1981 | Souder et al. ......... | 248/280.11 |
| 4,311,338 A | * | 1/1982 | Moorhouse ............ | 297/411.36 |
| 4,383,455 A | | 5/1983 | Tuda et al. ................ | 74/469 |
| 4,559,035 A | | 12/1985 | Benjamin et al. ............. | 604/73 |
| 4,775,289 A | | 10/1988 | Kazerooni .................. | 414/735 |
| 5,415,057 A | | 5/1995 | Nihei et al. ............... | 74/490.01 |
| 6,732,988 B2 | * | 5/2004 | Ihalainen et al. ......... | 248/276.1 |
| 2004/0064947 A1 | * | 4/2004 | Yanagimoto et al. ...... | 29/893.3 |

FOREIGN PATENT DOCUMENTS

| | | |
|---|---|---|
| JP | 06-71577 | 3/1994 |
| JP | 9-254073 | 3/1996 |
| JP | 9-254073 | 3/1997 |
| WO | WO 92/05016 | 2/1992 |

* cited by examiner

Primary Examiner—Ramon O Ramirez
(74) Attorney, Agent, or Firm—Conley Rose, P.C.

(57) ABSTRACT

Mechanisms for passive gravity compensation for a system of linkage arms are provided. Gravity compensation is provided through a pair of non-circular gear profiles, with an end of each linkage arm connected to a separate gear set of two non-circular cam bodies, by way of separate cables. Springs in the gear sets provide tension in the cables. The tension in each cable varies according to the angle through which the cam bodies have turned as a result of the co-operating non-circular surfaces of the cam bodies. This, in turn is based on the amount the arms have turned and thereby allows the tension in the cables to compensate for the moments on the arms due to gravity, whatever angles they are at, independently of the angle of the other arm. To achieve this for the first arm of the linkage, the tension in the cable leading to the second arm of the linkage is also transmitted as a torque to the first arm through a pulley mounted on the rotation axis of the first arm.

30 Claims, 4 Drawing Sheets

US 6,899,308 B2

PASSIVE GRAVITY-COMPENSATING MECHANISMS

FIELD OF THE INVENTION

This invention relates to passive gravity compensating mechanisms for arms, particularly in linkages, by using non-circular surface portions. The arms are supported at one end and are rotatable in the vertical plane with the other end not supported and not necessarily vertical. The invention is particularly useful for gravity compensating a system of multi-segment linkages, that is those having a number of arms.

BACKGROUND TO THE INVENTION

Arms which pivot in the vertical plane and are only supported in one place are well known and often used mechanisms. They can be just single arms lifting something at their distal ends or systems of multi-segment linkages, made up of several arms, each one pivotably linked but independently rotatable relative to the other in the vertical plane. In every case where the center of mass is not directly below (or above) the pivot point (and except where there is no force due to gravity) there is a moment about the pivot due to gravity. This tends to make the arm droop downwards and additional effort or energy is necessary to counteract or compensate for this.

A simple way of counteracting the moment due to gravity is by way of a counterweight. A first mass at one end of an arm is balanced by a second mass at the other end. The size of the second mass depends on the relative distances of the two masses to the pivot point. The problem with this is that it either at least doubles the space used or at least adds a mass to the system equivalent to the first mass.

FIG. 1 shows an alternative approach to gravity compensation. A mass 2 having a weight W0 acts at the end of an arm 4, a length L0 from a pivot point 6. It is compensated by a spring 8 acting on a circular surface portion centered on the pivot point 6, a distance R0 therefrom. The spring provides a tension T0 to the circular surface portion, thereby effecting a moment on the arm 4. For the moment due to the spring to compensate the moment due to gravity at any point:

$$T0*R0=W0*L0*\cos A,$$

Where A is the angle of the arm 4 to the horizontal.

As R0, W0 and L0 are constants, this means that T0 must vary with CosA. Therefore it is not a linear spring. The type of spring required is known as a non-linear negative spring, and a satisfactory one has yet to have been developed.

The counterweight and spring approaches are passive approaches. Active ones are known, based on sensors and actuators, but they add very much to the cost and complexity of a device.

The problem of gravity is exacerbated in multi-segment linkages, where several arms are connected together, each one pivotably linked but independently rotatable relative to the other in the vertical plane. Examples of machines which typically might include multi-segment linkages are robotic arms, manipulators, end effectors, three-dimensional measurement arms, lifting assist equipment, surgical scope holders, medical prosthetics, amongst other machines that operate with at least two degrees of freedom.

FIG. 2 shows a system 10 with a base 12 pivotably supporting one end of a first arm 14 at a first joint 16, which first arm pivotably supports a second arm 18 at its other end, at a second joint 20. The second arm 18 itself supports a load 22 at its distal end.

The moments about the first joint 16 are a function of the mass of the first arm 14, the angle of rotation of the first arm 14, and the mass of the second arm 18 and its load 22 and the angle of rotation of the second arm 18. The moments about the second joint 20 are a function of the mass of the second arm 18 and its load 22 and the angle of rotation of the second arm 18.

Thus for the second arm 18 and the load to be gravity compensated, the solution is to produce an external counteracting moment that is exactly the same in magnitude and opposite in direction to the moment about the second joint 20. For the first arm 14 to be gravity compensated, the solution is more complex and needs to take into account the coupled behavior of the whole system. Any counteracting moment at joint 1 will have to consider not just rotation about the first joint 16 but also the rotation about the second joint 20.

In the lower base joints of serial configuration robots, the force used to hold arms and move them against gravity can account for at least 50% of the work provided by the motors, leaving only 50% to do the useful work of moving the robot arm. This is very wasteful.

Published patent document WO 92/05016 describes gravity compensation using an eccentric pulley. The pulley is mounted on the pivot point of an arm and rotates with it. A compliant tendon, acting as a spring, is looped over the pulley. The eccentric pulley is designed to translate the linear spring behavior of the tendon into a nonlinear compensation torque. It is indicated that the approach can work for a multi-segment linkage, but it is not clear how this is achieved.

The present invention is intended to provide an original and inventive approach to passive gravity compensation.

SUMMARY OF THE INVENTION

According to one aspect of the present invention, there is provided a mechanism for gravity compensating a first rotatable member. The mechanism has first and second rotatable bodies. The first rotatable body is pivotable about a first axis, for rotating with the first rotatable member, and has a first non-circular surface portion. The second rotatable body is pivotable about a second axis and has a second non-circular surface portion. The mechanism also includes a first spring for biasing the second rotatable body in a rotation direction. The first and second rotatable bodies are arranged to rotate each other through the first and second non-circular surface portions.

According to another aspect of the present invention, there is provided a gravity compensated rotatable member system. The system includes a rotatably mounted first member, a spring biased first rotatable body mounted to rotate about a first pivot axis and having a first non-circular surface portion, a first circular surface portion mounted to rotate with the first member and a first cable connected to the first circular surface portion to pull in or pay out the first cable as the first circular surface portion rotates. The first rotatable body is connected to rotate with the first member by way of the first cable. The spring biased rotatable body is shaped such that the torque on the first circular surface portion due to the tension in the first cable compensates for the moment on the first member due to gravity.

According to again another aspect of the present invention, there is provided a gravity compensated rotatable member system having a plurality of members rotatably mounted in series, one on the other; a plurality of spring biased first rotatable bodies, one associated with each member and each having a first non-circular surface portion; a plurality of first circular surface portions, one associated with each member and mounted to rotate therewith; one or more second circular surface portions associated with each member, one second circular surface portion associated with each member mounted to rotate with each member preceding that member in the series; and a plurality of first cables, one associated with each member and connected to the first circular surface portion of the member with which it is associated, to pull in or pay out the first cable as the first circular surface portion rotates. Each first rotatable body is connected to rotate with its associated member by way of a first cable. Each cable passes over every second circular surface portion associated with the member with which it is associated and transmits the tension in the cable as a torque to the members with which those second circular surface portions rotate, through those second circular surface portions. The spring biased first rotatable bodies are shaped such that the combined torques on the members from the first and second circular surface portions, due to the tensions in the first cables, compensate for the moments on the members due to gravity.

According to yet another aspect of the present invention, there is provided a rotatable body rotatable about an axis and having a non-circular surface portion. The non-circular surface portion forms at least a portion of a curve which satisfies the equation $$R1 = B*C*(\text{Cos } A1)/\{C*(\text{Cos } A1) \pm D*\sqrt{[E^2 + 2*F*C*(\text{Sin } A1)]}\},$$

where R1 is the distance from the axis, A1 is the angle of rotation of the body and B, C, D, E and F are constants.

According to another further aspect of the present invention, there is provided a rotatable body rotatable about an axis and having a non-circular surface portion, wherein the non-circular surface portion forms at least a portion of a curve which satisfies the equation $$R2 = (B*D*(E+F*A2))/(D)*(E+F*A2)+C*(\text{Cos } A1))$$

where R2 is the distance from the axis, A2 is the angle of rotation of the body B, C, D, E and F are constants and where A1 satisfies the equation $$(\text{Sin } A1) = A2*(A2*F + 2*E)/2*C.$$

According to a yet further aspect of the present invention, there is provided a mechanism with a first rotatable body, pivotable about a first axis, having a first non-circular surface portion, and a second rotatable body, pivotable about a second axis, having a second non-circular surface portion. The first and second non-circular surface portions rotate with each other, such that the angle of rotation A2 of the second body is related to the angle of rotation A1 of the first body by $$A2 = \{-E \pm \sqrt{[E^2 + 2*F*C*(\text{Sin } A1)]}\}/F,$$

where C, E and F are constants.

The invention also covers rotatable bodies with non-circular surface portions which can be used in the above aspects.

Thus using the present invention, gravity compensation for a series of two linkage arms can be provided through a pair of non-circular gear profiles, with an end of each linkage arm connected to a separate gear set of two non-circular cam bodies, by way of separate cables. Springs in the gear sets provide tension in the cables. The tension in each cable varies according to the angle through which the cam bodies have turned as a result of the co-operating non-circular surfaces of the cam bodies. This, in turn is based on the amount the arms have turned and thereby allows the tension in the cables to compensate for the moments on the arms due to gravity, whatever angles they are at, independently of the angle of the other arm. To achieve this for the first arm of the linkage, the tension in the cable leading to the second arm of the linkage is also transmitted as a torque to the first arm through a pulley mounted on the rotation axis of the first arm.

BRIEF DESCRIPTION OF THE DRAWINGS

This invention is further described by way of non-limitative examples, with reference to the accompanying drawings, in which.

DETAILED DESCRIPTION

Figure 3:
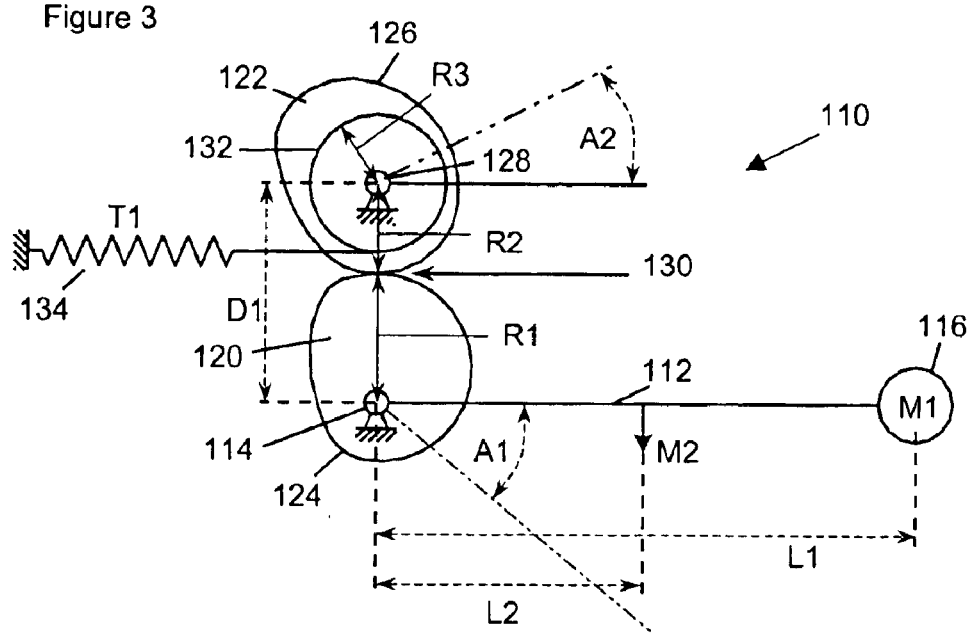
FIG. 3 illustrates a gravity compensation mechanism of a first embodiment.

FIG. 3 shows a gravity compensated system 110 according to a first embodiment of the invention.

A single arm 112 is mounted to rotate about a pivot point 114. The arm 112 has a length L1 with a mass M1 at its end 116. It also has its own mass M2, acting through its center of mass 118, at a distance L2 along the length of the arm 112. Assuming the arm is at an angle A1 to the horizontal, the moment about the pivot point 114, due to the arm 112 is:

$$([M1*L1]+[M2*L2])*g*\text{Cos } A1,$$

where "g" is the acceleration due to gravity.

The system 110 also includes two cam bodies 120, 122, with noncircular profiles in the form of non-circular outer surfaces 124, 126. A first cam body 120 rotates about the same pivot point 114 with the arm 112. The second cam body 122 rotates about a second pivot point 128. The non-circular outer surfaces 124, 126 remain in contact with each other, at a changing point of contact 130 (which always lies on a line directly between the first and second pivot points) and rotate with each other. Thus movement of the arm 112 rotates the first cam body 120 and thereby the first non-circular outer surface 124, which causes rotation of the second non-circular outer surface 126 and thereby the second cam body 122 in the opposite direction.

As the two cam bodies 120, 122 rotate, the total distance D1 between the pivot points 114, 128 remains the same, but the point of contact 130 changes, and the distance between the point of contact 130 and each pivot point 114, 128 changes, a variable R1 between the point of contact 130 and the first pivot point 114 and a variable R2 between the point of contact 130 and the second pivot point 128. Thus the rotation force at the point of contact 130, which is a function of the radius to the pivot point, is thereby a function of the angle of rotation of each cam body. For the first cam body 120, this is the same as the angle of rotation A1 of the arm 112. For the second cam body 122, the angle of rotation, A2, depends on the relative distances R1 and R2 which have been passed through during rotation.

An additional pulley portion 132, with a circular surface of constant radius R3 about the second pivot point 128 is integral within the second cam body 122. A first end of a spring 134 is fixed to the circular surface of pulley portion 132. The other end of the spring 134 is at a fixed position. The spring 134 applies a force T1 to the pulley portion 132, which acts to rotate the pulley portion 132 non-eccentrically about the second pivot point 128, thereby acting to rotate the whole second cam body 122, including the second cam body second non-circular outer surface 126. The spring 134 is linear (at least in the expected working range), with a constant stiffness K. As the second cam body 122 rotates, the pulley portion 132 rotates with it and changes the length of the spring 134, thereby changing the force applied by the spring to rotate the second cam body 122.

In this embodiment, the intention is for the rotation force at the point of contact 130, due to the moment on the arm 112 is to be cancelled by that due to the spring 134. They are to be equal and opposite.

The force at the point of contact 130, due to the moment on the arm 112 is:

$$([M1*L1]+[M2*L2])*g*(\cos A1)/R1$$

Rewriting
"[M1*L1]+[M2*L2])*g" as "MA0" (Moment due to the arm when A1=0), the force at the point of contact 130, due to the moment on the arm 112 is therefore:

$$MA0*(\cos A1)/R1$$

The force at the point of contact 130, due to the spring 134 is:

$$T1*R3/R2$$

Thus, for balance:

$$MA0*(\cos A1)/R1=T1*R3/R2 \quad (1).$$

Given that:

$$T1=K*(X0+x)=K*(X0+R3*A2),$$

where X0 is the extension of the spring when the angle A1 is 0 and x is the variable extension or shrinkage of the spring, then, from equation (1), $$MA0*(\cos A1)/R1=K*(X0+R3*A2)*R3/R2$$

Rewriting
"K*X0*R3" as "MS0" (Moment due to the spring when A2=0=A1 at that point), then $$MA0*(\cos A1)/R1=[MS0+K*(R3^2)*A2]/R2 \quad (2)$$

$$R1/R2=MA0*(\cos A1)/[MS0+K*(R3^2)*A2] \quad (3)$$

Given that $$R2=D1-R1,$$

Then, from equation (2) above $$MA0*(\cos A1)/R1=[MS0+K*(R3^2)*A2]/(D1-R1)$$

and $$(D1-R1)*MA0*(\cos A1)=[MS0+K*(R3^2)*A2]*R1$$

$$D1*MA0*(\cos A1)=R1\{[MS0+K*(R3^2)*A2]+MA0*(\cos A1)\}$$

$$R1=D1*MA0*(\cos A1)/\{MS0+MA0*(\cos A1)+[K*(R3^2)*A2]\} \quad (4)$$

where only A1 and A2 are variables.
Since D1=R1+R2, $$R2=D1*(MS0+K*R3*A2)/(MS0+MA0*(\cos A1)+K*R3^2*A2) \quad (5)$$

Separately, at any time:

$$R1*dA1=R2*dA2,$$

whereby $$R1/R2=dA2/dA1.$$

Thus, from equation (3) above $$MA0*(\cos A1)/[MS0+(K*(R3^2)*A2)]=dA2/dA1,$$

leading to $$[MA0*(\cos A1)]dA1=[MS0+(K*(R3^2)*A2)]dA2 \quad (6).$$

Integrating both sides of equation (6) leads to:

$$MA0*(\sin A1)+C=MS0*A2+K*(R3^2)/2*(A2^2).$$

When A1 is "0", so is A2. Thus C=0. Leading to $$K*(R3^2)*(A2^2)+2*MS0*A2-2*MA0*(\sin A1)=0$$

Solving this as a simple quadratic leads to:

$$A2=\{-MS0\pm\sqrt{[(MS0)^2+2*K*R3^2*MA0*(\sin A1)]}\}/K*(R3^2) \quad (7)$$

Combining equations (4) and (7) provides $$R1=[D1*MA0*(\cos A1)]/\{MA0*(\cos A1)\pm\sqrt{[(MS0)^2+2*K*R3^2*MA0*(\sin A1)]}\}.$$

Combining equations (5) and (7) provides $$R2=\{D1*(\pm\sqrt{[(MS0)^2+2*K*R3^2*MA0*(\sin A1)]})\}/\{MA0*(\cos A1)\pm\sqrt{[(MS0)^2+2*K*R3^{2\cdot}MA0*(\sin A1)]}\}$$

Based on this approach, the arm is balanced in static equilibrium whatever the angle it is at. However, it is usually advantageous to have some friction against rotation of the arm about the first pivot point 114 in either direction, to allow for slight inaccuracies or variations. Too much is undesirable as it will make the arm costly to move (at least in energy terms) when it is desired to do so.

The advantage of this approach over using a single cam body, with the spring attached to the outer surface of that, is that the spring never changes angle. It always leaves the circular surface of the pulley portion 132 at the same angle and position within the system, which reduces the complexity of calculations needed.

Figure 1:
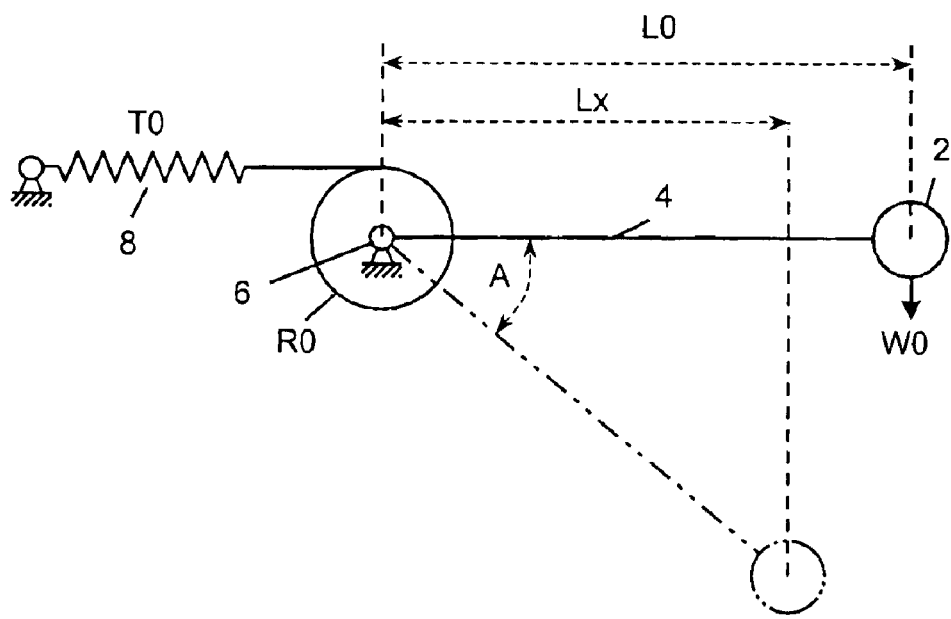
FIG. 1 illustrates a theoretical gravity compensated one-arm linkage system.
Figure 2:
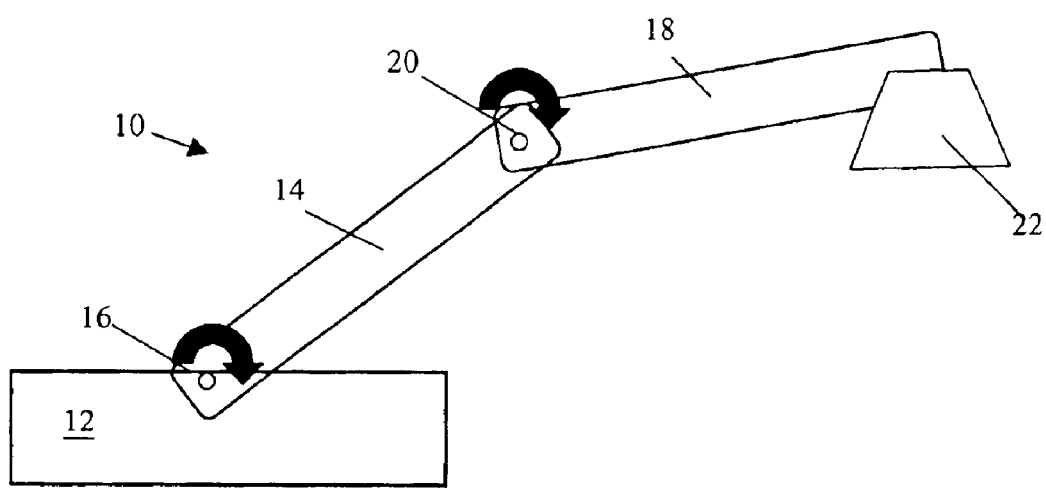
FIG. 2 illustrates a conventional gravity compensated two-arm linkage system.

The system of the above embodiment is substantially equivalent to that which would be produced by a desired non-linear negative spring, discussed earlier with respect to FIG. 1.

In the embodiment of FIG. 3, the arm is mounted on the same axis as a first cam body and rotates with it. The invention is also applicable to less direct situations, for instance where the arm is mounted to rotate about a third axis, as in FIG. 4. Where the reference numbers are the same as in FIG. 3, then the components and their operation are generally the same. This mechanism is the same as that of the embodiment of FIG. 3, except that the first, passive cam body 120 includes a first circular gear 150 of a constant radius R4. This first circular gear 150 is mounted about the same first axis 114, with the first, passive cam body 120 joined to rotate with the first circular gear 150. The outer surface of the first circular gear 150 is in contact with the outer surface of a second circular gear 152, mounted to rotate about the third axis 154. The second circular gear 152 is of a constant radius R5. The arm 156 is mounted to rotate about the same third axis 154, with the second circular gear 152. The first and second circular gears rotate with each other. Thereby rotation of the arm 156 rotates the second circular gear 152, which rotates the first circular gear 150 and the first, passive cam body 120. This in turn rotates the second cam body 122 and the pulley portion 132 and changes the tension in the spring 134.

Figure 4:
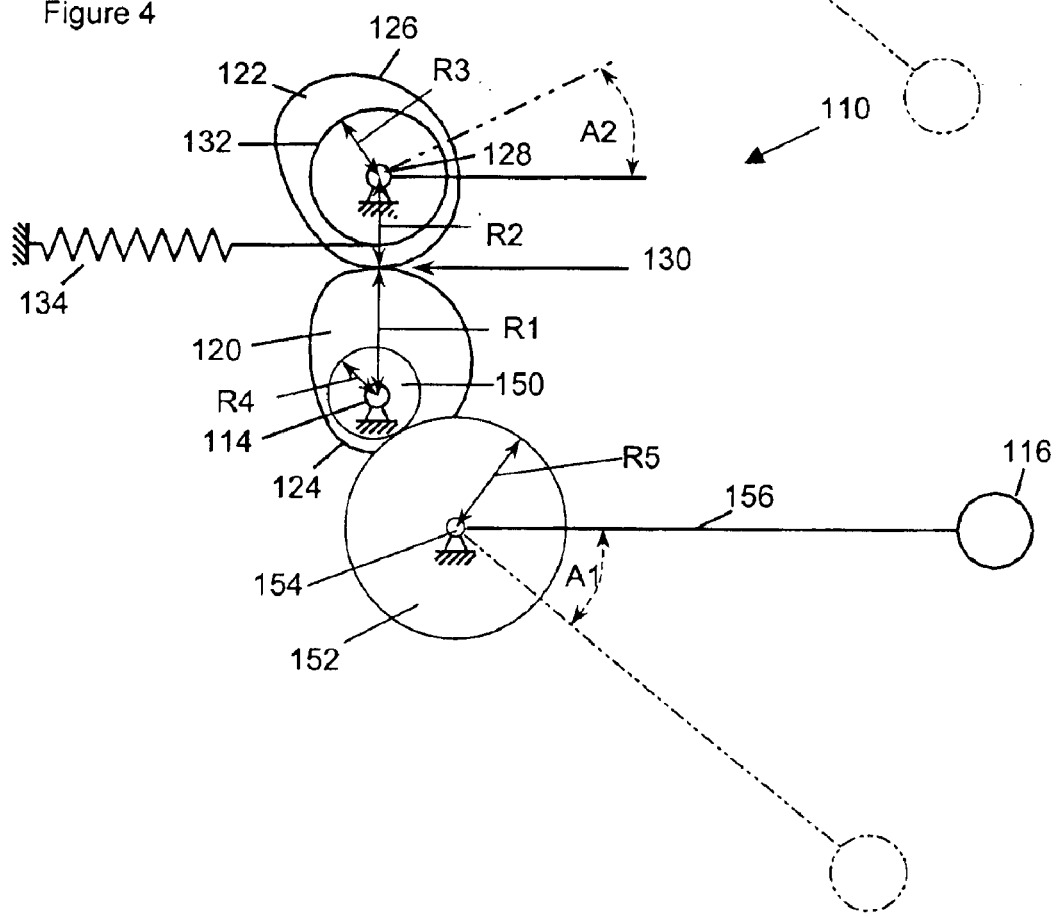
FIG. 4 illustrates a gravity compensation mechanism of a second embodiment.

This mechanism of the second embodiment, of FIG. 4, works in much the same way as the first embodiment, except through the two gears 152, 154. The difference this makes to the calculations above is that an additional term "R4/R5" is included as a multiplier on the left hand side of equation (1) above, to give:

$$MA0*(\text{Cos } A1)*(R4/R5)/R1 = T1*R3/R2,$$

which leads to changes elsewhere in the derivations of the final shapes.

$$R1 = D1*[MA0*(\text{Cos } A1)]/(MA0*(\text{Cos } A1)+(R5/R4)*(MS0+K*R3^2*A2))$$

and $$R2 = D1*(R5/R4)*(MS0+K*R3^2*A2))/((R5/R4)*(MS0+K*R3^2*A2)+MA0*(\text{Cos } A1))$$

where $$A2 = \{-MS0 \pm \sqrt{[(MS0)^2+2*K*R3^2*MA0*(\text{Sin } A1)]}\}/K*(R3^2)$$

which is unchanged.
Thus $$R1 = D1*[MA0*(\text{Cos } A1)]/(MA0*(\text{Cos } A1)+(R5/R4)*\sqrt{[(MS0)^2+2*K*R3^2*MA0*(\text{Sin } A1)]})$$

and $$R2 = \pm(D1*(R5/R4)*\sqrt{[(MS0)^2+2*K*R3^2*MA0*(\text{Sin } A1)]})/(MA0*(\text{Cos } A1)+(R5/R4)*\sqrt{[(MS0)^2+2*K*R3^2*MA0*(\text{Sin } A1)]}).$$

This embodiment of FIG. 4 is preferred over that of FIG. 3 in terms of ease of construction, since the larger R5/R4 is, the smaller the change in R1 (and therefore also in R2) for any change in A1. Such smoother profiles are generally easier to fabricate.

Figure 5:
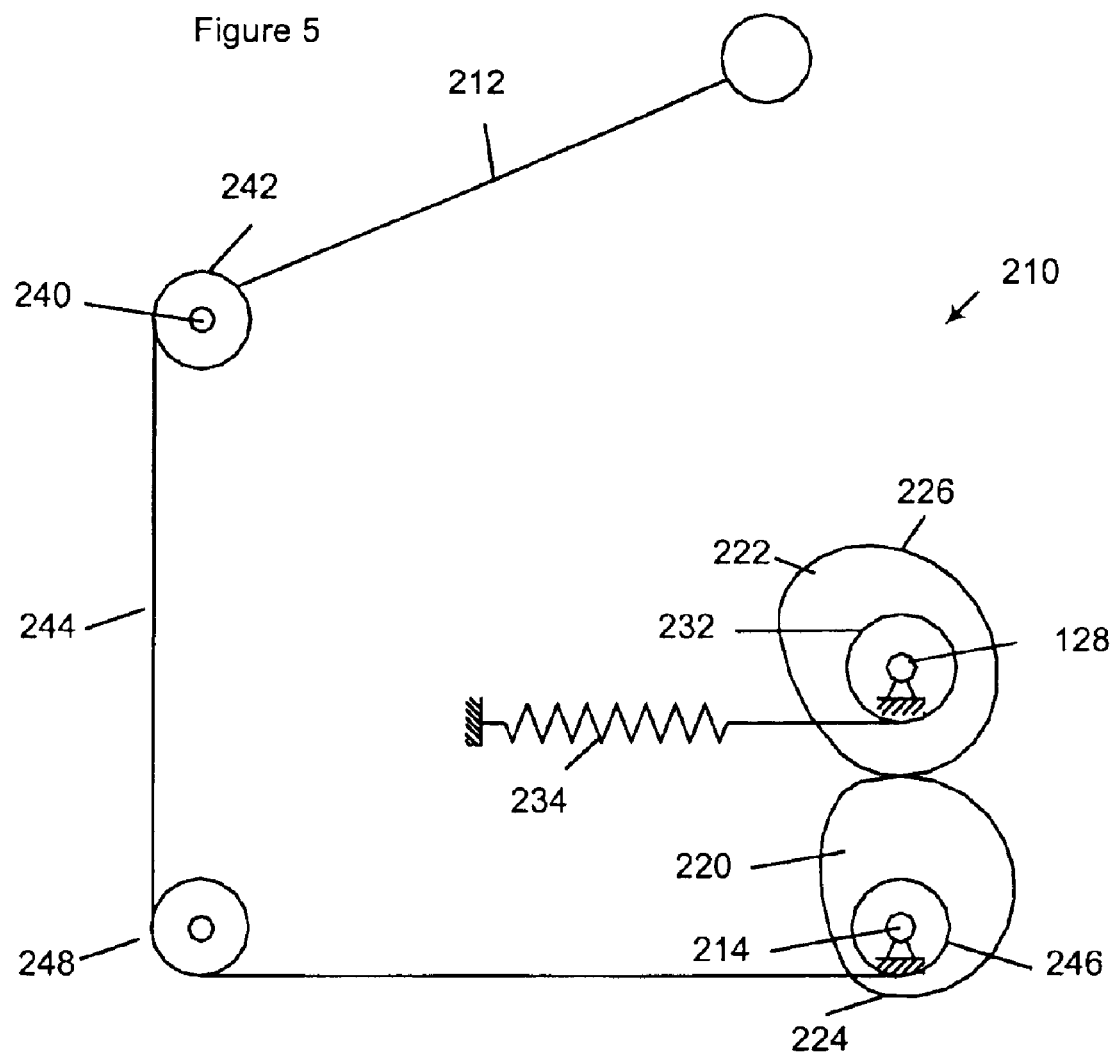
FIG. 5 illustrates a gravity compensation mechanism of a third embodiment.

FIG. 5 shows a gravity compensated system 210 according to a third embodiment of the invention, in which an arm 212 is mounted about a separate third pivot point 240, but this time spaced away from the cam bodies. A circular pulley 242 is mounted to rotate about the same third pivot point 240. A steel cable 244 has one end mounted onto the outer surface of the circular pulley 242, so that when the arm rotates up or down and rotates the pulley 242, the cable 244 is paid out or pulled in, respectively.

A pair of cam bodies 220, 222, with non-circular outer surfaces 224, 226 is mounted elsewhere in the system. In FIG. 5 they are shown as being below the pivoting arm 212, although they could be above, beside, or elsewhere. The second cam body 222 is the same as the second cam body of the first embodiment and includes a circular surface pulley portion 232, to which is attached one end of a spring 234. The first cam body 220 is slightly different from the first cam body of the first embodiment in that it too has a circular surface pulley portion 246, centered about its pivot point 214 (rather than being attached to the rotating arm). The other end of the cable 244 is around the circular surface of the pulley portion 246 of the first cam body 220, having first passed around a second pulley 248. Thus when the cable is pulled, the pulley portion 246 of the first cam body 220, and thereby the first cam body 220 itself, is rotated in one direction and when the cable is paid out, the pulley portion 246 of the first cam body 220, and thereby the first cam body 220 itself, is allowed to rotate in the other direction (and does so due to the action of the spring 234 on the second cam body 222).

When the circular surface of the pulley portion 246 of the first cam body 220 is the same radius as the pulley 242, this is equivalent to the system of FIG. 3 and the two cam bodies 220, 222 can have the same shape as those of FIG. 3. If there is a difference in sizes, it will have an effect requiring a redesign of the cam body outer surfaces.

The second pulley 248 can be removed if space and general arrangement allows it. It may be joined by a number of other pulleys on the way between the first pulley and the first cam body if necessary or desired.

Another advantage of this approach is that the cam part of the system is away from the linkage. Thus it does not add much, if at all, to the complexity of design around the linkage itself. That has a simple round pulley to act with it, which takes less space. There is also the advantage that if the load is to change, thereby requiring a change in the cam designs, the cam bodies can be made more readily accessible for changing. It also allows greater flexibility if there are space constraints around the pivot point of the arm.

The cable is steel, as that tends not to stretch over the used ranges of strains that it takes. Other materials can be used, preferably inextensible ones (over the relevant ranges). Elastic materials can be used, but again complicate calculations.

Some friction against rotation of the arm is again advantageous.

The third embodiment uses two cam bodies, as in the first and second embodiments. In an alternative embodiment, not shown, the second cam body can be dispensed with. The spring can act directly on the outer non-circular surface portion of a first cam body. As the point of action of the spring on the first cam body varies with the radius, it changes the moment on the cam body due to the spring, according to the rotation of the cam body, both as the spring length and point of action vary. The calculations for shaping the non-circular surface portion may be more complex, as the point of contact between the spring and cam body may vary in two dimensions, but there is still the advantage over the prior art that the cam portion is away from the actual pivot point of the arm. However, in such an embodiment the range of motions is more limited as a single cam will require more severe and perhaps excessive changes in radii at times, which makes it much harder to fabricate. On the other hand, having two cams amplifies the rotation of the cam profile. This allows a smoother profile which is easier to make.

In a further alternative embodiment, there is again a single first cam body, but the spring is attached to the circular surface portion of the cam body, rather than the cable being attached thereto. The cable is attached to the outer non-circular surface portion. As the point of action of the cable on the first cam body varies with the radius, it changes the moment on the cam body due to the cable, according to the rotation of the cam body, both as the tension on the cable and the point of action vary. The calculations for shaping the non-circular surface portion may be more complex, as the point of contact between the spring and cam body may vary in two dimensions, but there is still the advantage over the prior art that the cam portion is away from the actual pivot point of the arm. The calculations for shaping the non-circular surface portion may be more complex, as the point of contact between the cable and cam body may vary in two dimensions, but there is still the advantage over the prior art that the cam portion is away from the actual pivot point of the arm.

In yet another alternative embodiment, both the spring and cable act on non-circular surface portions of a first cam body. The calculations may be more complex again, but with the same advantage of removing the cam body from the arm pivot.

The above embodiments illustrate the invention applied to a single arm linkage. The present invention is equally useful with multi-segment linkages, i.e. those with more than one arm.

In the case of the first embodiment of FIG. 3, the compensation mechanism is mounted with the pivoting arm. It will continue to work as long as it maintains the same orientation relative to the vertical. It may therefore be quite useful where the absolute angle of the arm for which it provides compensation is to stay the same when the absolute angle of the arm on which it sits (or that of any other previous arms in the system) is altered. This mechanism is quite clearly not affected by the motion of any other arms (except in terms of its actual position).

Figure 6:
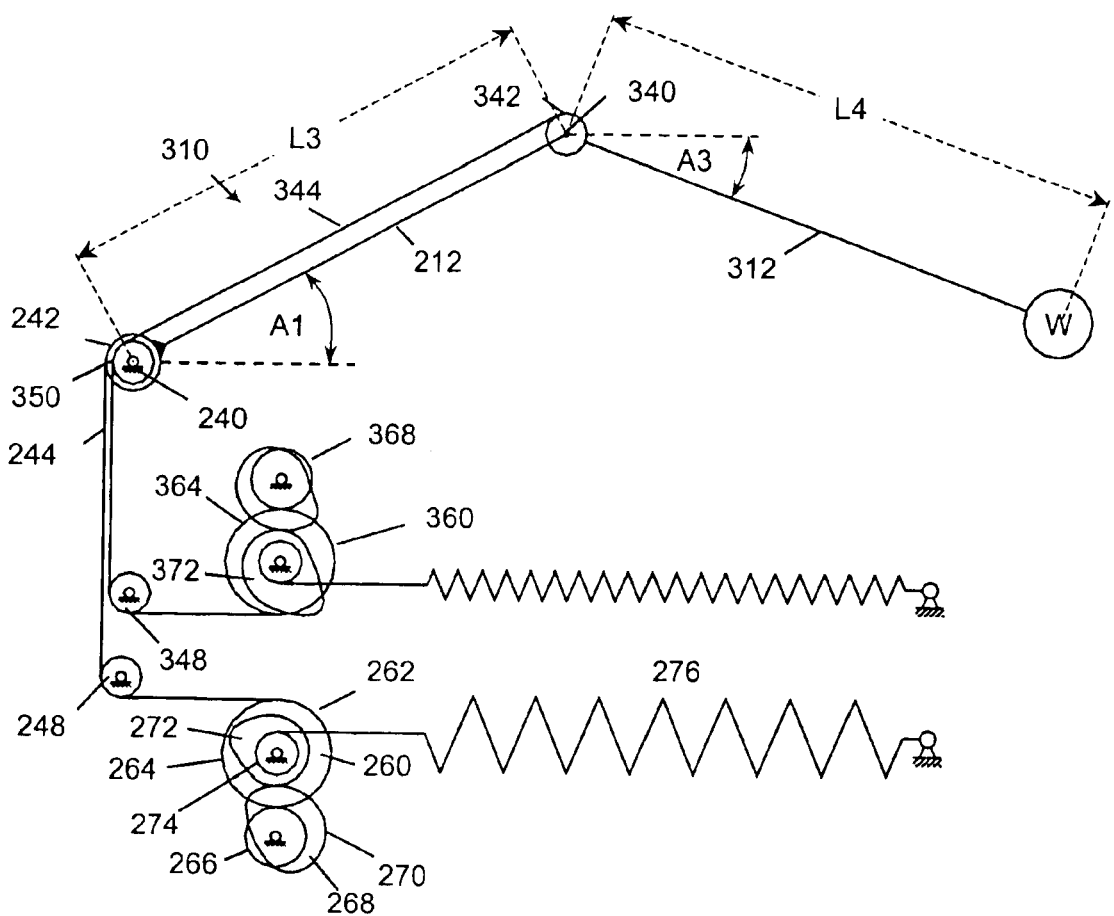
FIG. 6 illustrates a gravity compensation mechanism of a fourth embodiment.

A double arm mechanism 310 is shown in FIG. 6. A first arm 212 has a second arm 312 on its end, each arm using a compensation system of a fourth embodiment. The changes in forces, which are needed for gravity compensation are provided by the non-circular profiles and spring mechanisms. In this embodiment, for every variation of change in either arm, the other arm is unchanged in angle, i.e. decoupled. The extension of this is that in any multi-segment linkage, a particular link n can rotate and not affect link n+1 and link n−1.

The first arm 212 and parts of its compensation mechanism are the same as in FIG. 5 and are numbered accordingly. The arm 212 rotates with a first circular pulley 242 about a third pivot point 240. One end of a first steel cable 244 is mounted on the outer surface of the first circular pulley 242 and passes around a second pulley 248. Where this aspect of this embodiment differs from what is shown in FIG. 5 is in the cam and spring mechanism.

The other end of the first steel cable 244 is mounted around a third circular pulley 264 of a combined gear and pulley body 260, which includes a first circular gear 262 on the same axis (and of the same radius in this example). When the third pulley 264 of the combined gear and pulley body 260 rotates, the first gear 264 of the combined gear and pulley body 260 also rotates in the same direction and through the same angle. The first gear 264 is meshed with a second circular gear 266 of a combined gear and cam body 268, which also includes a first cam body 270, with a non-circular outer surface, on the same axis. The first cam body 270 is constrained to rotate with the second gear 266 in the same direction and through the same angle. The outer surface of the first cam body 270 is in contact with the non-circular outer surface of a second cam body 272, which rotates about the same axis as the combined gear and pulley body 260. The second cam body 272 is able to rotate freely relative to the combined gear and pulley body 260 (except in that it is constrained here by its contact with the first cam body 270). A pulley portion 274, with a circular surface is integral within the second cam body 272 on the same axis. A cable links one end of a linear spring 276 to the circular surface of the pulley portion 274.

The cam and spring mechanism of the first arm 212 works in much the same way as in the previous embodiments. The difference is in that there is an extra link, between the first and second gears, before the varying force is applied by the varying contact of the cams. Thus when the first arm 212 is rotated clockwise as it appears in FIG. 6, the first cable 244 is pulled out from the third pulley 264 of the combined gear and pulley 260. This rotates the first gear 264 anti-clockwise, which causes the second gear 266 to rotate clockwise. The first cam body 270 rotates with the second gear 266, which causes the second cam body 272 to rotate anti-clockwise. The pulley portion 274 rotates with the second cam body 272 and extends the spring 276, thereby increasing the tension.

The second arm 312 is mounted on the distal end of the first arm 212 and is pivotable thereon about a separate fourth pivot point 340. A fourth circular pulley 342 is mounted to rotate about the same fourth pivot point 340. A second steel cable 344 has one end mounted onto the outer surface of the fourth circular pulley 342. A second cam and spring mechanism, similar to that provided with the first arm 212 is provided for the second arm 312 and includes a second combined gear and pulley body 360, a second combined gear and cam body 368 and a fourth cam body 372, arranged to operate in the same way. The second cable 344 passes over a fifth pulley 348 before passing over the sixth pulley 364, of the second combined gear and pulley body 360. The second cam and spring mechanism is shown as proximal to the cam and spring mechanism for the first arm 212, but they can be separated from each other.

In this embodiment as illustrated the cables for the two sets of cam bodies cause rotation of their respective first cam bodies in opposite directions. The design for the cam bodies is easily altered accordingly. Quite clearly, alternative arrangements will allow rotation of the two sets of cam bodies in the same directions when the arms move in the same directions.

The second arm compensation mechanism is provided with a further freewheeling seventh pulley 350. The seventh circular pulley 350 is mounted on the same axis as the first pulley 242 (of the first arm compensation mechanism), that is the third pivot point 240. The second cable 344 passes around the seventh pulley 350. The seventh circular pulley 350 is the same size as the fourth circular pulley 342 (so that the effective cable length remains unchanged). As the seventh pulley is freewheeling, any rotation of the first arm 212, without any change in the absolute angle of the second arm does not change the tension in the second cable 344. That is only changed when the absolute angle of the second arm (i.e. its angle relative to the horizontal [or vertical]) changes. The seventh circular pulley 350 is also the same size as the first circular pulley 242 (this is not necessary, but allows the use of fewer different types of components). In FIG. 6, the first and fifth pulleys 242, 350 differ in size. However, this is only so they can both be seen.

The cam body designs for each arm compensation mechanism is the same as for the single arm systems, including the fact that the weight at the end of an arm will include the weight of all the other arms (and anything else) carried by that arm.

In the embodiment of FIG. 6, the various relevant moments can be determined to show the decoupling of the arms. For simplicity, the moments due to the weights of the arms themselves are not mentioned separately but are lumped in with the weights at the ends of the arms (duly adjusted), as they are constants and do not change with the angle.

Each of the first and fourth circular pulleys 242, 342 has a radius R. The first arm 212 has a length L3. The second arm 312 has a length L4. The weight at the end of the first arm 212 is W1. The weight at the end of the second arm 312 is W2. The angle between the horizontal and the first arm 212 is A1. The angle between the horizontal and the second arm 312 is A3. The force F1 on the first cable 244 is determined by the amount it is pulled by the first circular pulley 242, which amount is a proportional to A1. This is for what the spring and cam mechanism for the first cable 244 is designed. Thus the force on the first cable 244 is F1(A1), that is it is a function of A1. Likewise, the force F2 on the second cable 344 is determined by the amount it is pulled by the fourth circular pulley 342. Thus the force on the second cable 344 is F2(A3), that is it is a function of A3.
Given the above:

The moment MA1 about the third pivot point 240 due to the first and second arms 212, 312 is determined as:

$$MA1=(W1+W2)*L3*\cos A1 + W2*L4*\cos A3$$

The moment MC1 about the third pivot point 240 due to the first and second cables 244, 344 is determined as:

$$MC1=[F1(A1)+F2(A3)]*R.$$

[if the pulley sizes differed, this would be different $$F1(A1)*\text{Radius of pulley } 242 + F2(A3)*\text{Radius of pulley } 342]$$

The moment MA2 about the fourth pivot point 340 due to the second arm 312 is determined as:

$$MA2=W2*L4*\cos A3.$$

The moment MC2 about the fourth pivot point 340 due to the second cables 344 is determined as:

$$MC2=[F2(A3)]*R.$$

Thus the total moment MT1 about the third pivot point 240 is determined as:

$$MT1=[F1(A1)+F2(A3)]*R-(W1+W2)*L3*\cos A1-W2*L4*\cos A3,$$

and the total moment MT2 about the fourth pivot point 340 is determined as:

$$MT2=[F2(A3)]*R-W2*L4*\cos A3.$$

For a statically balanced condition, MT1=0 and MT2=0

Quite clearly A1 has no effect on MT2. Thus changing the angle of the first arm 212 has no effect on the moments affecting the second arm 312 and thus no effect on its angle A3. On the other hand, A3 does appear in the result for MT1. However, as long as the second arm is correctly compensated, i.e. MT2=0, this means that the components of MT1 that contain A3 disappear and changing the angle of the second arm 312 has no effect on A1.

It is quite clear from the above that this approach will also work with more than two arms, for example three, four or five. In each case, as long as the weight of what each arms is carrying is taken into account, suitable cam bodies can be designed to compensate each arm.

The cable going over the pulleys may be wrapped around through just part of their circumferences. However, it may be preferable to use completely circular pulleys and wrap the cables around more than once, for example to ensure the rope or line does not slip off a pulley when an arm rotates over its vertical axis.

In the embodiment shown in FIG. 6, the second cam body is on the same axis as the combined gear and pulley body. However, it could be on a different axis. The description mentions combination bodies with a pulley and a gear, a cam body and a gear and a pulley portion and a cam body. These do not need to be single integral bodies but could be separated into component bodies linked to rotate together as appropriate, for instance on a keyed axle.

Whilst the embodiment of FIG. 6 uses a different cam and spring mechanism from that shown in FIG. 5, a multi arm embodiment could use several of the same cam and spring mechanisms as in FIG. 5, or the alternative mechanisms discussed with respect to FIG. 5 could be used instead, or a combination of different such mechanisms. The various advantages to those mechanisms are also inherent to this embodiment too. Likewise, the cam and spring mechanism of FIG. 6, or its alternatives, could be used in the embodiment of FIG. 5.

In the above embodiments, the non-circular and circular surface portions, including the circular pulley, are shown as if rotation through 360 degrees were necessary. However, in many uses, this is not required. Thus the design need only be for the relevant range of movement that is necessary. The remaining portions can be circular or whatever other shape or shapes may be desired or convenient. The cam body my have or even just consist of sectors of circular and/or non-circular shapes. Where two cam bodies are used, rotation outside the range can be prevented by shaping the contacting surfaces such that further rotation is impossible. According to the ranges necessary, the circular and non-circular surface portions of any cam body may lie on the same circumference (e.g. in the same plane orthogonal to the axis or rotation of the cam body), but at different angular positions. Likewise if a cam body has two non-circular surface portions, they may also be able to lie in different portions of the same circumference.

For the above embodiments, the non-circular and circular surface portions may be formed integrally in the same bodies or provided separately on the same axis or pivot point, for instance connected to rotate by way of slots and keys or co-operating splines. Alternatively, they can be on separate axes, and connected through gears or the like. The provision of intervening gears allows flexibility of construction.

The spring in the above embodiments is a linear spring, working in either tension or compression. The spring does not need to be a spring per se, but could be any kind of suitable consistent biasing means. It can be open or in a cylinder and providing damping if desired. It is also possible to use a constant force spring instead, for instance applying it against a pinion wheel on a cam body, for instance a circular pinion wheel on the second cam body for the first two embodiments, using a ratchet mechanism. This can even be used when no compensation is required (for example when the arm is vertical), as long as it has sufficiently low mechanical advantage and there are some friction losses. Such a spring would lead to even simpler calculations for designing the cam bodies (as T1 would not be a function of A1).

The non-circular surface portions in the above embodiments can be simply cammed surfaces.

Where there are two rotating surfaces in contact, slip is to be avoided. The preferred approach is to use a flexible but taut inextensible band (for instance a metal, such as steel), with one end attached to one surface portion and the other end to the other surface portion. The band runs along one surface, through a plane containing the pivot axes for the two respective rotating bodies and preferably the point of contact between the two surfaces and then along the other surface, generally in an "s" shape. Where the band is attached to the surface portions is beyond the two most extreme points of contact between the non-circular profiles. If necessary, the band can be mounted in a very shallow groove to prevent slip transverse to the plane of rotation. This can be for any or all of the non-circular surface portions and gears etc., instead of teeth etc.

Slip can be avoided if there is sufficient friction (for instance if the contacting surfaces are of rubber or the like). However, friction tends not to be reliable and if there is any slip, there will be errors. Thus it is better if the surfaces positively engage each other. For instance, the contacting surface portions can have positively engaging teeth, and be designed suitably to prevent any or excess backlash or free-play. The cable can be a chain, allowing the pulley as well as the surface of the first cam body to which it is attached, whether circular or non-circular, to be toothed.

In the above embodiments, the cam bodies have non-circular outer surfaces. However, the non-circular surfaces do not have to be the outer ones. Suitable profiles can be achieved in other ways, for instance a set of teeth arranged in a non-circular pattern on the side of a circular plate, or in other ways. The function is to vary the torque applied to one body by another, as desired. Further, in the described embodiments the non-circular portions are in direct contact. However, it would be possible to interpose bodies between them, for instance a circular gear on a moving axis.

The invention has been described with reference to gravity compensating one or more arms. Whilst that is a preferred use, the invention would also work with other rotatable members, whether elongate or otherwise, whether the rotation point is at one end or otherwise and whether any other members in series are at an end or otherwise.

Thus the invention is particularly useful for gravity compensating a system of multiple arms, where the effect of gravity on each of the arms and gravity compensation vary with the angles of the arms. The invention decouples the kinematics and kinetics of each arm from those of each other arm.

The present invention provides full compensation of arms at all positions without relying heavily or at all on frictional devices to provide the rest of the moment. The invention allows a range of motion as wide as the linkage functions require. The invention allows every arm of a multi-segment linkage to be fully compensated at all positions. The mathematical model is for a constant load and hence a different load would not be 100% gravity compensated. For a similar load, friction and, if necessary the movement motor could step in to help. If the loads change considerably, it just requires a redesign and refitting of the cam bodies, which can be readily accessible. The invention can be compact and lightweight, just relying on two cam bodies, some pulleys, a spring and a cable for each arm. The invention also has the advantage of relative simplicity.

If a linkage is gravity compensated, then the effects of gravity are nullified. The arm structure is therefore effectively weightless with, inter alia, the following benefits:

1) The linkage is in a state of static equilibrium at all positions and it would not droop or shift position.

2) The motors or any other actuators that are moving the linkage could be much smaller as it would be moving only the weight of the end tool and not the entire weight of the linkage and tool.

3) Dynamic response characteristics of a gravity compensated linkage are superior.

While only a few embodiments of the invention have been embodied, it is to be understood that many changes, modifications, variations or improvements could be made, including the use of any or all equivalents without departing from the spirit or scope of the invention.

What is claimed is:

1. A mechanism for gravity compensating a first rotatable member, comprising:

the first rotatable member;

a first rotatable body, pivotable about a first axis, mounted to rotate as the first rotatable member rotates and having a first non-circular surface portion;

a second rotatable body, pivotable about a second axis, having a second non-circular surface portion; and a first spring for biasing the second rotatable body in a rotation direction; wherein the first and second rotatable bodies are arranged to rotate each other through the first and second non-circular surface portions; and the first and second non-circular surface portions are sized and shaped and the first spring has a property such that the torque on the first member provided through the first rotatable body compensates for gravity on the first rotatable member.

2. A gravity compensating mechanism according to claim 1, wherein the first and second non-circular surface portions are arranged to rotate without relative slip.

3. A gravity compensating mechanism according to claim 1, wherein the first and second non-circular surface portions are arranged to rotate each other directly.

4. A gravity compensating mechanism according to claim 1, further comprising a flexible belt having two ends, one of the ends mounted on the first rotatable body and the other end mounted on the second rotatable body and the belt passing between the first and second rotatable bodies and through a plane containing the first and second axes.

5. A gravity compensating mechanism according to claim 1, wherein the first and second non-circular surface portions are sized and shaped such that the rotational torque of the first rotatable body, due to the spring, varies according to a cosine of a multiple of the angle of rotation of the first rotatable body.

6. A gravity compensating mechanism according to claim 1, wherein the first and second rotatable bodies are each arranged to rotate between two extreme positions, between which the direction in which the first spring biases the second rotatable body to rotate is unchanging.

7. A gravity compensating mechanism according to claim 1, further comprising a first cable having two ends; and wherein the first member is mounted on a third pivot axis and the first rotatable body is connected to rotate with the first member by way of the first cable.

8. A gravity compensating mechanism according to claim 7, further comprising a first circular surface portion arranged to rotate with the first rotatable body; and wherein one end of the cable is connected to the first member and the other end is connected to said first circular surface portion.

9. A gravity compensating mechanism according to claim 8, wherein the first circular surface portion is integral with the first rotatable body.

10. A gravity compensating mechanism according to claim 8, wherein the first circular surface portion is arranged to rotate with the first rotatable body through a gear mechanism.

11. A gravity compensating mechanism according to claim 7, further comprising a third circular surface portion mounted to rotate with the first member on the third pivot axis; and wherein one end of the cable is connected to the third circular surface portion to pull in or pay out the first cable as the third circular surface portion rotates.

12. A gravity compensating mechanism according to claim 1, further comprising a second circular surface portion arranged to rotate with the second rotatable body; and wherein one end of the first spring is connected to said second circular surface portion.

13. A gravity compensating mechanism according to claim 1, wherein the first spring is a linear spring having two ends.

14. A gravity compensating mechanism according to claim 1, wherein the first rotatable member is an arm.

15. A gravity compensating mechanism according to claim 1, further comprising:

a third rotatable body for rotating about a third pivot axis and providing a torque for gravity compensating a second member, the third rotatable body having a third non-circular surface portion;

a fourth rotatable body for rotating about a fourth pivot axis and having a fourth non-circular surface portion; and a second spring for biasing the fourth rotatable body in a rotation direction; wherein the third and fourth rotatable bodies are arranged to rotate each other through the third and fourth non-circular surface portions.

16. A gravity compensating mechanism according to claim 15, further comprising:

a rotatable first member; and a rotatable second member; and wherein the first rotatable body is arranged to rotate with the first member;

the third rotatable body is arranged to rotate with the second member;

the first and second non-circular surface portions are sized and shaped and the first spring has a property such the torque on the first member provided through the first rotatable body compensates for gravity on the first member; and the third and fourth non-circular surface portions are sized and shaped and the second spring has a property such the torque on the second member provided through the third rotatable body compensates for gravity on the second member.

17. A gravity compensating mechanism according to claim 16, further comprising:

a first cable having two ends;

a second cable having two ends;

a first circular surface portion mounted to rotate with the first member; and a second circular surface portion mounted to rotate with the second member; wherein one end of the first cable is connected to the first circular surface portion to pull in or pay out the first cable as the first circular surface portion rotates with the first member and the first rotatable body is connected to rotate with the first member by way of the first cable; and one end of the second cable is connected to the second circular surface portion to pull in or pay out the second cable as the second circular surface portion rotates with the second member and the second rotatable body is connected to rotate with the second member by way of the second cable.

18. A gravity compensating mechanism according to claim 17, further comprising:

one or more additional members rotatably connected in series on the second member;

an additional two rotatable bodies for each additional rotatable member;

an additional cable for each additional rotatable member; and an additional circular surface portion mounted to rotate with each additional member; wherein one end of each additional cable is attached to a respective additional circular surface portion; and the second end of each additional cable is attached to a rotatable body of the respective additional two rotatable bodies.

19. A gravity compensating mechanism according to claim 1, wherein the first rotatable body is rotatable relative to the second rotatable body; and as the first and second rotatable bodies rotate each other through the first and second non-circular surface portions, an amount through which the first body rotates varies relative to an amount through which the second body rotates.

20. A gravity compensating mechanism according to claim 1, wherein the first rotatable body is arranged to rotate the second rotatable body through the first and second non-circular surface portions; and the second rotatable body is arranged to rotate the first rotatable body through the second and first non-circular surface portions.

21. A rotatable body rotatable about an axis and having a non-circular surface portion, wherein the non-circular surface portion forms at least a portion of a curve which satisfies the equation $$R1 = B*C*(\cos A1)/\{C*(\cos A1) \pm D*\sqrt{[E^2 + 2*F*C*(\sin A1)]}\},$$

where

R1 is a distance along a straight line from the axis to a point on the curve,

A1 is an angle of rotation of the body between said straight line and a datum line passing through the axis, and B, C, D, E and F represent numerical values which are constant for the non-circular surface portion.

22. A rotatable body rotatable about an axis and having a non-circular surface portion, wherein the non-circular surface portion forms at least a portion of a curve which satisfies the equation $$R2 = (B*D*(E+F*A2))/(D)*(E+F*A2) + C*(\cos A1))$$

where

R2 is the distance along a straight line from the axis to a point on the curve,

A2 is an angle of rotation of the body between said straight line and a datum line passing through the axis, B, C, D, E and F represent numerical values which are constant for the non-circular surface portion, and where A1 satisfies the equation $$(\text{Sin } A1) = A2*(A2*F + 2*E)/2*C.$$

23. A mechanism comprising:
a first rotatable body, pivotable about a first axis, having a first non-circular surface portion; and
a second rotatable body, pivotable about a second axis, having a second non-circular surface portion;
wherein the first and second non-circular surface portions rotate with each other, such that an angle of rotation A2 of the second body relative to a second datum is related to an angle of rotation A1 of the first body relative to a first datum by $$A2 = \{-E \pm \sqrt{[E^2 + 2*F*C*(\text{Sin } A1)]}\}/F,$$

where C, E and F represent numerical values which are constant for the non-circular surface portion.

24. A gravity compensated rotatable member system comprising:
a rotatably mounted first member;
a spring biased first rotatable body mounted to rotate about a first pivot axis and having a first non-circular surface portion;
a first circular surface portion mounted to rotate with the first member; and
a first cable connected to the first circular surface portion to pull in or pay out the first cable as the first circular surface portion rotates; wherein
the first rotatable body is connected to rotate with the first member by way of the first cable; and
the spring biased rotatable body is shaped such that the torque on the first circular surface portion due to the tension in the first cable compensates for the moment on the first member due to gravity.

25. A gravity compensated rotatable member system comprising:
a plurality of members rotatably mounted in series, one on the other;
a plurality of spring biased first rotatable bodies, one associated with each member and each having a first non-circular surface portion;
a plurality of first circular surface portions, one associated with each member and mounted to rotate therewith;
one or more second circular surface portions associated with each member, one second circular surface portion associated with each member mounted to rotate with each member preceding that member in the series; and
a plurality of first cables, one associated with each member and connected to the first circular surface portion of the member with which it is associated, to pull in or pay out the first cable as the first circular surface portion rotates; wherein
each first rotatable body is connected to rotate with its associated member by way of a first cable;
each cable passes over every second circular surface portion associated with the member with which it is associated and transmits the tension in the cable as a torque to the members with which those second circular surface portions rotate, through those second circular surface portions; and
the spring biased first rotatable bodies are shaped such that the combined torques on the members from the first and second circular surface portions, due to the tensions in the first cables, compensate for the moments on the members due to gravity.

26. A mechanism for gravity compensating a first rotatable member, comprising:
a first rotatable body, pivotable about a first axis, for receiving a first torque profile generated by the first rotatable member as the first rotatable member rotates, for rotating with the first rotatable member and having a first non-circular surface portion;
a second rotatable body, pivotable about a second axis, having a second non-circular surface portion; and
a first spring for biasing the second rotatable body in a first rotation direction; wherein
the first and second rotatable bodies are arranged to rotate each other through the first and second non-circular surface portions;
the first and second non-circular surface portions have sizes and shapes and the first spring has a property which are selected for use with a first rotatable member which generates a predetermined first torque profile as the first rotatable member rotates;
the first spring causes the first rotatable body to generate a second torque profile to apply to the first rotatable member as the first rotatable body rotates; and
the second torque profile corresponds to the predetermined first torque profile.

27. A mechanism for gravity compensating a first rotatable member, comprising:
a first rotatable body, pivotable about a first axis, for rotating with the first rotatable member and having a first non-circular surface portion;
a second rotatable body, pivotable about a second axis, having a second non-circular surface portion; and
a first spring for biasing the second rotatable body in a rotation direction; wherein
the first and second rotatable bodies are arranged to rotate each other through the first and second non-circular surface portions;
the first rotatable body is rotatable relative to the second rotatable body; and
as the first and second rotatable bodies rotate each other through the first and second non-circular surface portions, an amount through which the first body rotates varies relative to an amount through which the second body rotates.

28. A mechanism for gravity compensating a first rotatable member, comprising:
a first rotatable body, pivotable about a first axis, for rotating with the first rotatable member and having a first non-circular surface portion;
a second rotatable body, pivotable about a second axis, having a second non-circular surface portion; and
a first spring for biasing the second rotatable body in a rotation direction; wherein
the first rotatable body is arranged to rotate the second rotatable body through the first and second non-circular surface portions; and
the second rotatable body is arranged to rotate the first rotatable body through the second and first non-circular surface portions.

29. A mechanism for gravity compensating a first rotatable member, comprising:

a first rotatable body, pivotable about a first axis, for rotating with the first rotatable member and having a first non-circular surface portion;

a second rotatable body, pivotable about a second axis, having a second non-circular surface portion; and a first spring for biasing the second rotatable body in a rotation direction; wherein the first and second rotatable bodies are arranged to rotate each other through the first and second non-circular surface portions; and the first and second rotatable bodies are each arranged to rotate between two extreme positions, between which the direction in which the first spring biases the second rotatable body to rotate is unchanging.

30. Gravity compensating mechanism according to claim 29, wherein the first rotatable body is arranged to receive a first torque profile generated by the first rotatable member as the first rotatable member rotates;

the first and second non-circular surface portions have sizes and shapes and the first spring has a property which are selected for use with a first rotatable member which generates a predetermined first torque profile as the first rotatable member rotates;

the first spring causes the first rotatable body to generate a second torque profile to apply to the first rotatable member as the first rotatable body rotates; and the second torque profile corresponds to the predetermined first torque profile.

* * * * *